Figure 1:
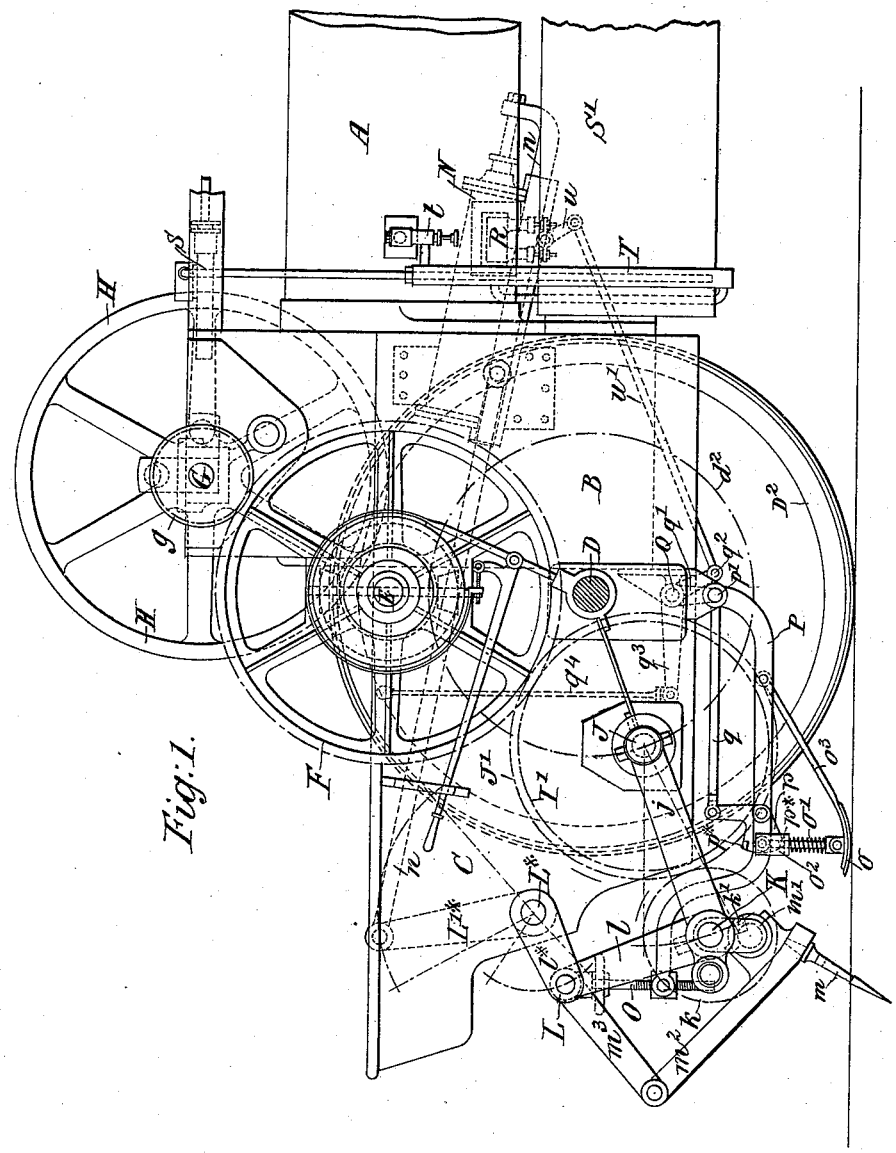

(No Model.) 7 Sheets—Sheet 1.

T. COOPER.
STEAM ENGINE FOR CULTIVATING LAND.

No. 534,426. Patented Feb. 19, 1895.

Witnesses:—
George Barry,
Fred Haynes

Inventor:—
Thomas Cooper
by attorneys
Brown & Seward (No Model.) 7 Sheets—Sheet 3.
T. COOPER.
STEAM ENGINE FOR CULTIVATING LAND.

No. 534,426. Patented Feb. 19, 1895.

Witnesses:—
George Barry,
Fred't Haynes

Inventor:
Thomas Cooper
by attorneys
Brown & Seward (No Model.) 7 Sheets—Sheet 4.
T. COOPER.
STEAM ENGINE FOR CULTIVATING LAND.
No. 534,426. Patented Feb. 19, 1895.
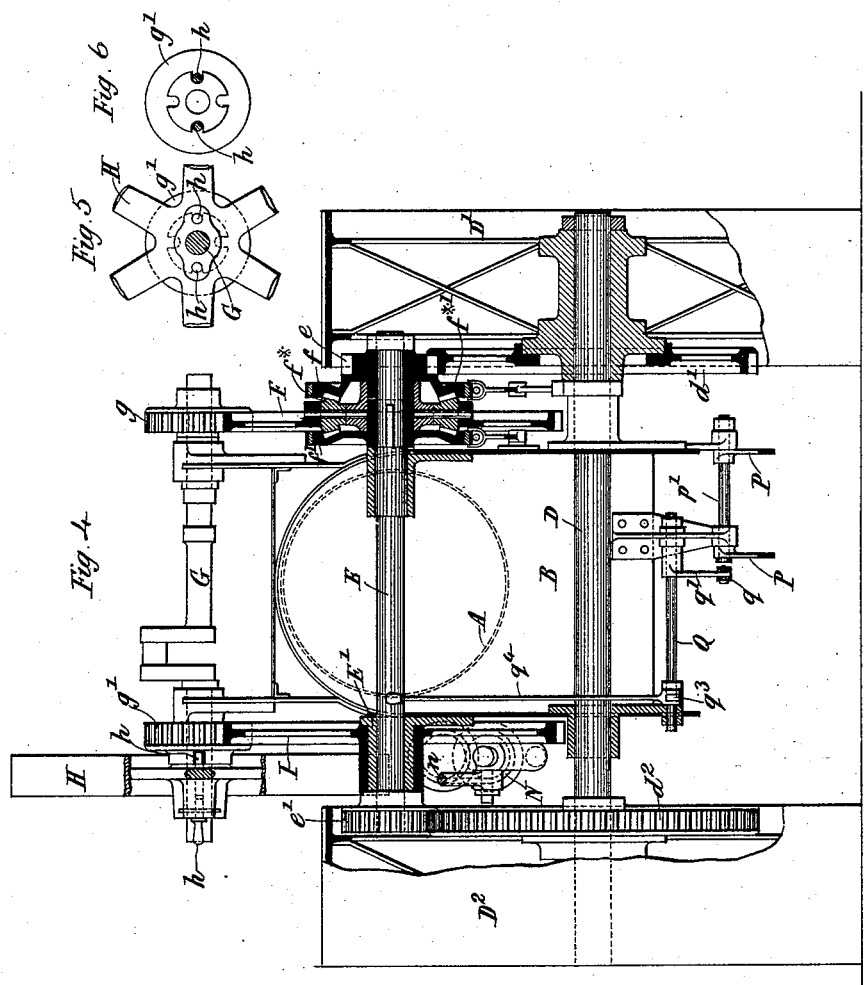
Witnesses:—
George Barry
Fred Haynes
Inventor:
Thomas Cooper
by attorneys
Brown & Seward (No Model.) 7 Sheets—Sheet 5.
T. COOPER.
STEAM ENGINE FOR CULTIVATING LAND.
No. 534,426. Patented Feb. 19, 1895.
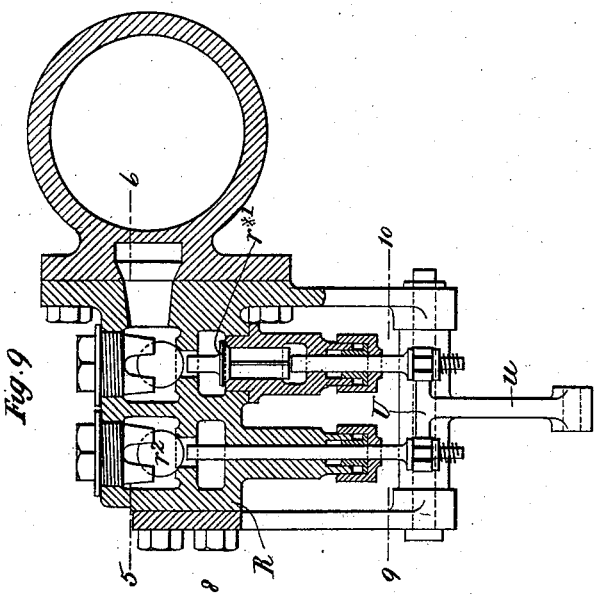
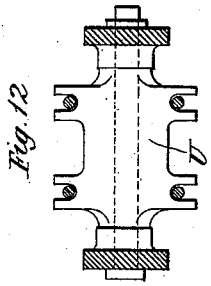
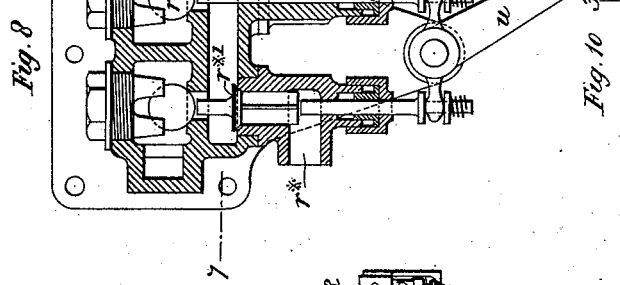
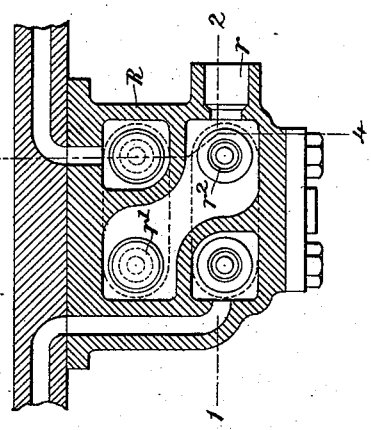
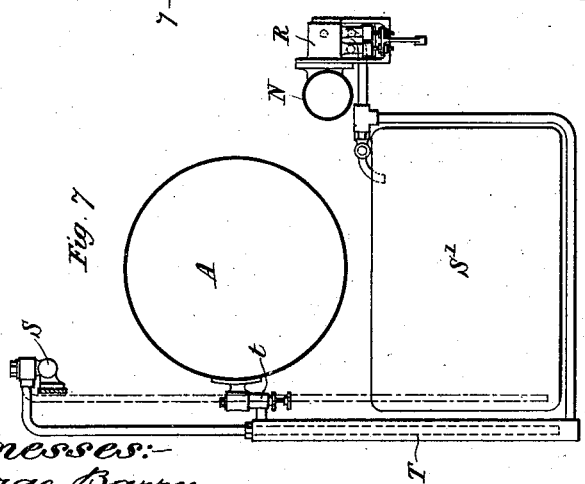
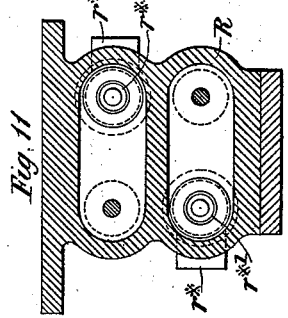
Witnesses:—
George Barry.
Fred'k Haynes
Inventor:—
Thomas Cooper
by attorneys
Brown & Seward
THE NORRIS PETERS CO., PHOTO-LITHO., WASHINGTON, D. C.

(No Model.) 7 Sheets—Sheet 6.
T. COOPER.
STEAM ENGINE FOR CULTIVATING LAND.
No. 534,426. Patented Feb. 19, 1895.
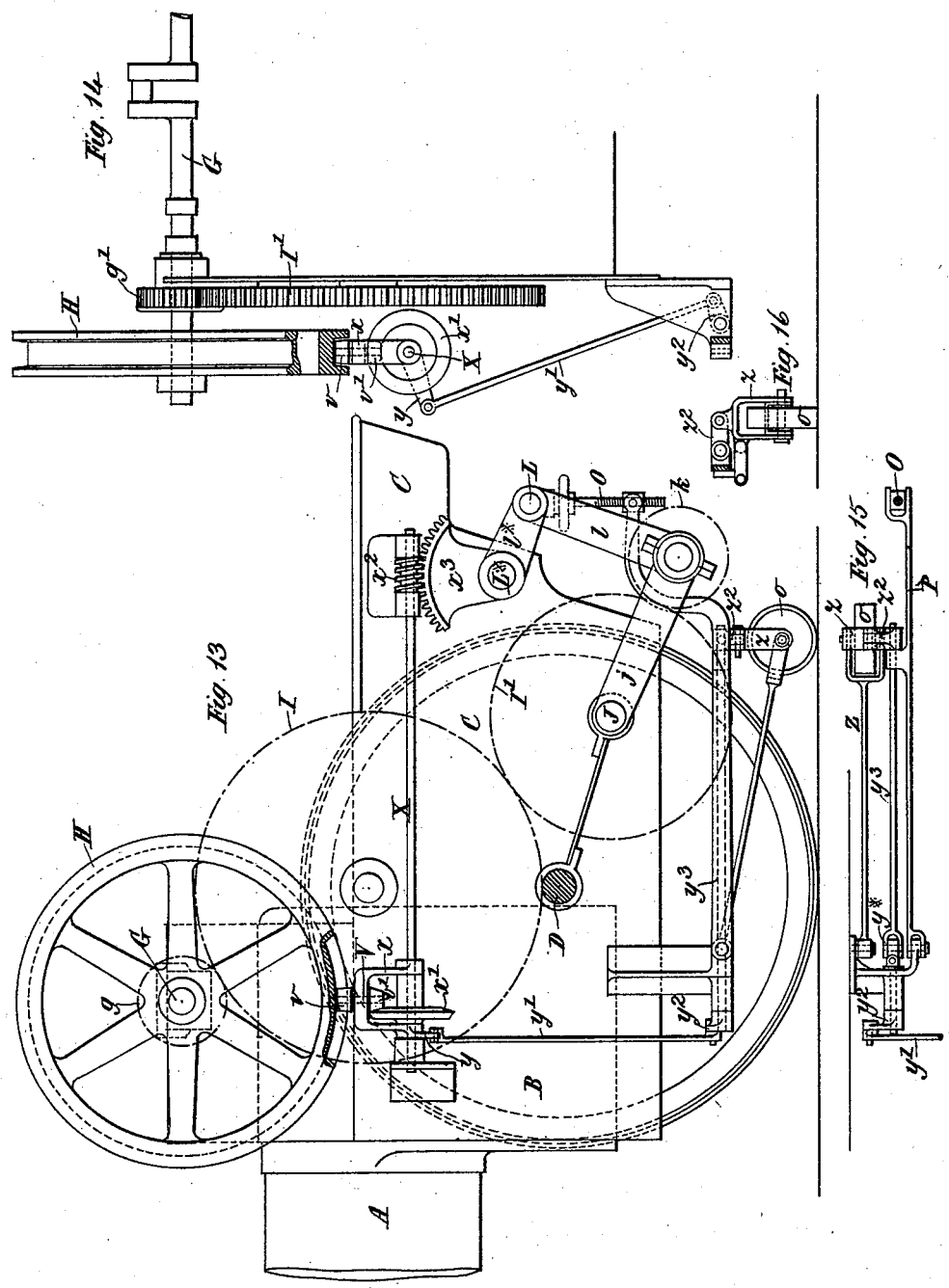
Witnesses:—
George Barry,
Fred Haynes
Inventor:—
Thomas Cooper
by attorneys
Brown & Seward (No Model.) 7 Sheets—Sheet 7.
T. COOPER.
STEAM ENGINE FOR CULTIVATING LAND.

No. 534,426. Patented Feb. 19, 1895.

Witnesses:—
George Barry
Fred Haynes

Inventor:—
Thomas Cooper
by attorneys
Brown & Seward

UNITED STATES PATENT OFFICE.

THOMAS COOPER, OF GREAT RYBURGH, ENGLAND.

STEAM-ENGINE FOR CULTIVATING LAND.

SPECIFICATION forming part of Letters Patent No. 534,426, dated February 19, 1895.

Application filed July 24, 1894. Serial No. 518,446. (No model.)

*To all whom it may concern:*

Be it known that I, THOMAS COOPER, of Great Ryburgh, in the county of Norfolk, England, have invented certain new and useful Improvements in Steam-Engines for Cultivating the Land and for other Agricultural Purposes, of which the following is a specification.

The engine which forms the subject of the present invention is intended to be used for traction and general agricultural purposes and is also fitted with digging mechanism for tilling and cultivating the soil. It is to the improvement of this digging mechanism that the present invention is more particularly directed.

Engines for general agricultural purposes fitted with cultivating mechanism have already been made subjects of invention and of patents and some of these have been found to work admirably under favorable conditions.

It is my present object to produce an engine capable of doing the best work under all conditions and circumstances.

A source of failure in practical working which has not hitherto been surmounted lies in the absence of a satisfactory method of automatically regulating the depth of stroke of the digging forks according to the varying level of the surface traversed by the engine. Engines which have done good work when traveling over an even surface have been found to alternately bury the diggers and miss the ground altogether when put to work over ridge and furrow or other irregular ground.

A practicable method of raising and lowering automatically the diggers as the engine travels over uneven surfaces so as to insure always the cultivation of the soil to a proper and regular depth as well as other improvements in connection with a general purpose agricultural engine including means for facilitating turning short round will now be described reference being had to accompanying drawings wherein corresponding parts are designated by like letters throughout.

Figure 2:
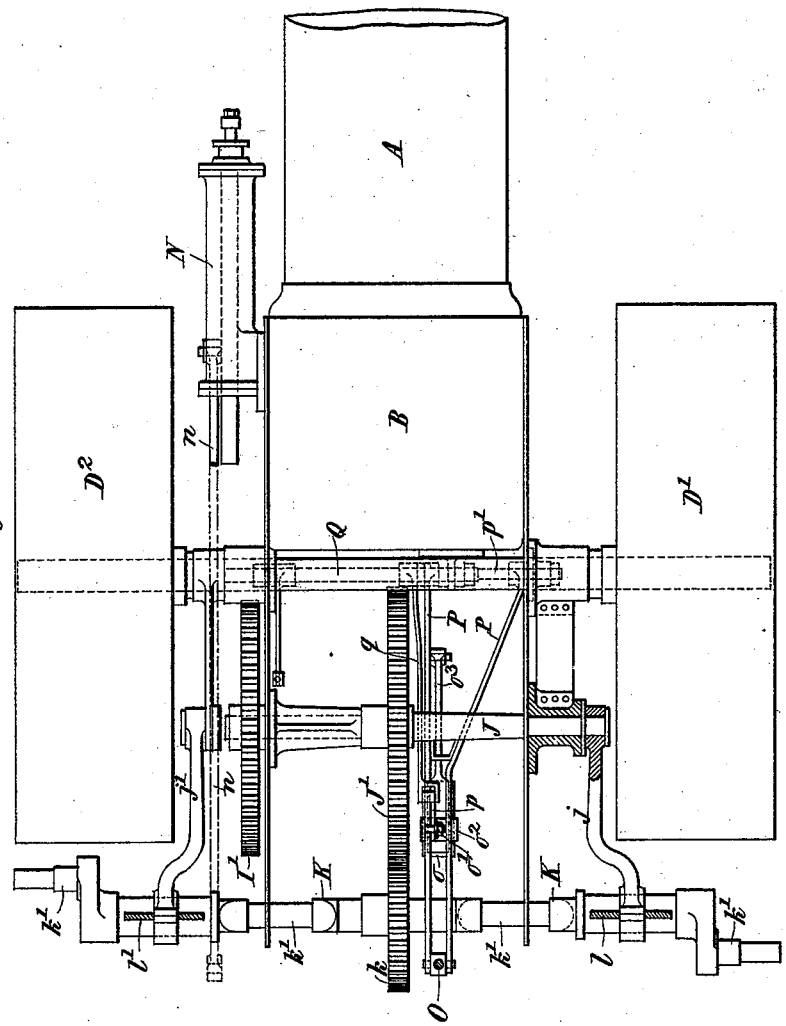
Figure 3:
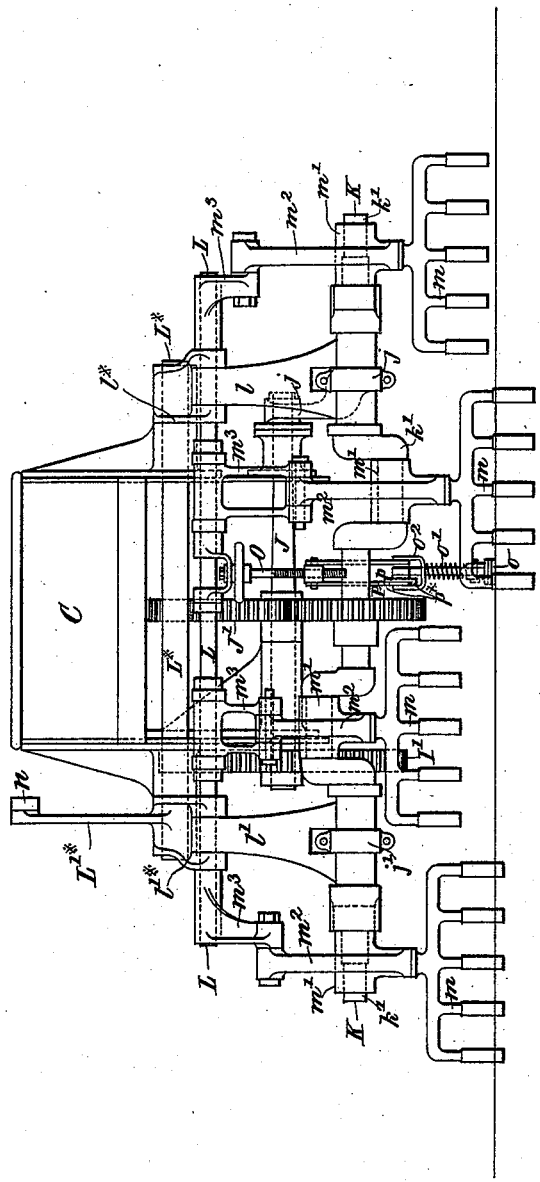
Figure 19:
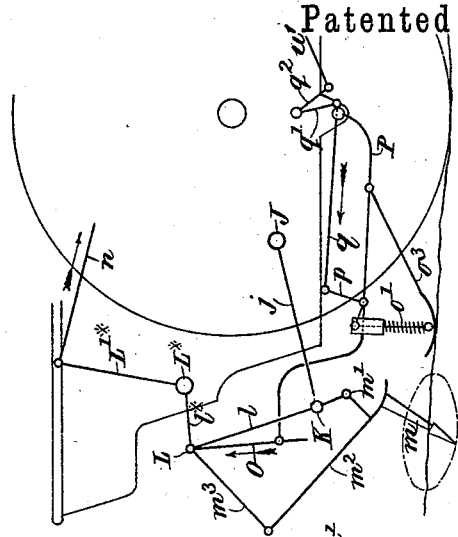
Figure 18:
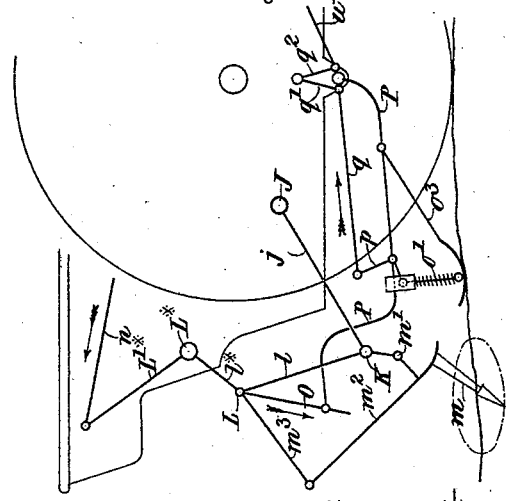
Figure 17:
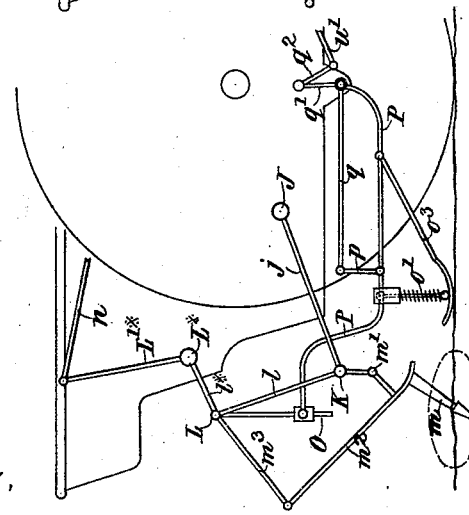

Figure 1, Sheet I, shows in side elevation the hind portion of an agricultural engine embodying my improvements. Fig. 2, Sheet II, is a partial plan of the same. Fig. 3, Sheet III, is a back view of the digging forks and gear. Fig. 4, Sheet IV, is a back view of the engine with the digging gear removed. Figs. 5 and 6, Sheet IV, are details which will be hereinafter described. Figs. 7, 8, 9, 10, 11 and 12, Sheet V, are detached views of the feed water tank and certain valve mechanism in connection with the digger raising or lowering mechanism, Fig. 8 being a vertical section on line 1, 2, of Fig. 10, Fig. 9 being a section at right angles thereto on line 3, 4, Fig. 10, Fig. 10 being a horizontal section on line 5, 6, Fig. 9, Fig. 11 a horizontal section on line 7, 8, Fig. 8, and Fig. 12 a horizontal section on line 9, 10, Fig. 9. Figs. 13 and 14, Sheet VI, illustrate in side and end views a modification of the mechanism for raising and lowering automatically the digger forks. Figs. 15 and 16 are plan and end views of a portion of this regulating mechanism detached. Figs. 17, 18, and 19, Sheet VII, are diagram side views illustrating the automatic raising and lowering of the diggers, Fig. 17 representing the engine traveling on a level, Fig. 18 the engine about to ascend an incline, and Fig. 19 the engine about to descend an incline.

I have not thought it necessary to show the whole of the engine in the accompanying drawings but only so much as is required to illustrate my present invention.

The boiler A the end only of which appears in the drawings is of the usual type and carries upon it the engine cylinders not shown.

B is the fire box behind the boiler and C is the tender behind the fire box.

D is the main axle upon which are mounted the main road wheels $D'$ $D^2$. These road wheels are driven by tooth wheels $d'$ $d^2$ attached thereto and engaging with pinions $e$ $e'$ carried by the counter shaft E which is mounted in bearings supported by wing plates attached to the fire-box B. Upon the counter shaft E is supported a differential gearing such as is sometimes found in traction engines which enables the wheels to be driven separately or both together. This differential gearing comprises a pair of face wheels $f$ $f'$ a driven toothed wheel F and a pair of bevel pinions $f^*$ $f'^*$ mounted diametrically opposite each other within the wheel F so as to be carried round therewith. They are capable also of rotating at right angles thereto.

The bevel pinions $f^* f'^*$ both engage with the face wheels $f f'$ as best seen at Fig. 4.

The pinion $e$ is in one with the face wheel $f$ both being loose upon the counter shaft E. The face wheel $f'$ is keyed to the counter shaft as also is the pinion $e'$. When the wheel F is driven by the pinion $g$ keyed to the crank shaft G the tendency is to drive both face wheels $f f'$ by the teeth of the bevel wheels $f^* f'^*$ engaging therewith and acting merely as locking devices connecting the two face wheels. In this manner both road wheels are driven evenly until one or other becomes retarded either by the steering gear or by brake bands applied to the face wheels $f$ or $f'$ as shown in the drawings. This braking or retarding of one wheel causes the bevel wheels $f^* f'^*$ to run round so as to continue to drive the wheel on the opposite side without interruption. Thus when one wheel is held fast by means of the brake band operated by a lever in the hand of an attendant and the engine continues to be driven the latter is turned short round on the fixed wheel in a very small space. This is a matter of great importance as much time is thus saved when turning at the headlands.

Besides the pinion $g$ the crank shaft G carries a fly wheel H situated at the opposite end and permanently keyed thereto. This fly wheel serves as a band pulley when the engine is used for stationary purposes, to drive a thrashing machine for instance. It also serves the ordinary purposes of a fly wheel in overcoming the dead points particularly when the diggers are in action.

Movement is conveyed to the diggers from the crank shaft G by the pinion $g'$ loose thereon but capable of being fixed to the fly wheel by bolts $h\ h$ engaging with holes in the face of the pinion $g'$. (See Fig. 4 and detached views Figs. 5 and 6.) The pinion $g'$ engages with the intermediate wheel I which turns loosely upon the sleeve bearing $E'$ of the counter shaft E.

The intermediate wheel I engages with another wheel $I'$ (see Fig. 2) fast upon a horizontal transverse shaft J upon which also is another wheel by means of which and the wheel $J'$ the digger shaft K is driven. The bearings of the digger shaft K are slung in radial arms $j\ j'$ pivoted concentrically with the shaft J so that the raising or lowering of the digger shaft K does not disengage the wheels $J'$ and $k$ or interfere in any way with the continued driving of the latter by the former during the automatic adjustment I am about to describe.

The digger shaft K besides having bearings in the radial arms $j\ j'$ before mentioned is supported by a pair of links $l\ l'$ pendent from the transverse rod L which is carried by radial arms $l^*\ l'^*$ fast on the rock shaft $L^*$ mounted in bearings in the framing of the tender. This shaft $L^*$ has upon it a crank arm $L'^*$ by means of which the transverse shaft $L^*$ actuated by suitable power as hereinafter explained is rocked and caused to lift or lower the rod L with the digger shaft K and all thereon suspended.

The digging forks $m$ which according to Fig. 3 of the drawings are four in number and of five prongs each are operated by cranks $k'$ formed in the digger shaft K. These cranks $k'$ are embraced by loose sleeves or collars $m'$ to which the forks are bolted. A reciprocating movement is thus imparted to the forks as the shaft is rotated which reciprocation is controlled and regulated by links $m^2$ jointed to the sleeves $m'$ and to loose radial arms $m^3$ carried by the transverse rod L and caused to give to the forks an oval or approximately oval stroke admirably adapted for tilling operations. Adjustment of the links $m^2$ and arms $m^3$ as regards their length will effect a variation in the stroke of the forks when such variation is desired.

I now come to that part of my invention which deals with the automatic raising and lowering of the digger forks to accommodate the work to the inequalities of the soil over which the engine is traveling.

It has been seen how the digger shaft K is loosely mounted or slung so that it can be raised or lowered by rocking the shaft $L^*$ without disengaging the gear wheels $J'$ and $k$ the one from the other. The rocking of the shaft $L^*$ it has been said is effected by the arm or lever $L'^*$ actuated by suitable power. The power which I prefer to employ is a hydraulic motor the cylinder N of which is attached to the side of the engine as shown best at Fig. 2 of the drawings. The piston rod of this motor is connected by a cross head with the rod $n$ which is jointed to the arm $L'^*$ before named. The in and out movement of the motor piston is in this way utilized for raising and lowering the digger shaft and forks attached thereto. In order to make the raising and lowering of the digger shaft automatic and dependent upon the contour of the surface over which the engine is traveling the valves of the hydraulic motor cylinder are put into connection with a shoe or feeler which trails upon the ground and follows the inequalities thereof.

$o$ is the feeler (see Fig. 1) upon the lower end of a pendent rod $o'$ pivoted to one arm of a bell crank lever $p$. This bell crank lever $p$ is fulcrumed between the arms of a framing P one end of which is fulcrumed on the rod $p'$ (see Fig. 4) supported in brackets beneath the fire box. The other end of the framing is supported by a screw O pendent from the rod L by means of which screw the position of the frame P with regard to the ground may be adjusted by hand before work is commenced.

$o^2$ is a loop spanning the arms of the frame P. (See Fig. 3). This loop is pierced to form a guide for the rod $o'$ of the feeler $o$. It also forms an abutment for the coiled spring which surrounds the said feeler rod to work against.

$o^3$ is a strengthening rod attached to the feeler o and jointed to the frame P for the purpose of maintaining the feeler rod in a vertical position.

The bell crank lever p has only a limited rocking movement on its fulcrum by reason of the lugs $p^*$ which strike against the framing P above and below and check the movement. The arm of the lever p opposite to that whereon the feeler rod $o'$ is pivoted is jointed to a rod q which is pivoted to the arm $q'$ fixed on the rock shaft Q. (See Fig. 4). Another arm $q^2$ on the same rock shaft is connected with the valve gear of the hydraulic motor so that the rocking of the bell crank p by reason of the up and down movement of the feeler operates to open and close the valves and consequently to work the same.

The reason for mounting the feeler and the lever which it operates on a swinging frame such as P is as follows: Not only is it desirable to adjust the height of the feeler from time to time as may be done by the screw O but it is also necessary in operating the valves of the hydraulic cylinder or other source of power that the motor should be set in action and stopped at any point.

Were there not some provision to prevent it the motor once set in action in one direction or the other would continue to operate and lift and lower the diggers to a greater degree than was desirable. I have however guarded against this by providing that the initial movement in either direction of the bell crank p operated by the feeler shall be overtaken by the frame P, which, being connected by the screw O to the digger mechanism, continues to move in the same direction so that the independent movement of the bell crank which works the valves is neutralized by the frame which follows it and re-establishes the relative positions of the bell crank and frame whereupon it is fulcrumed. In other words it is only the differential movement between the rod q attached to the bell crank p at one end and the valve actuating arm $q'$ at the other and the framing P that produces the moving of the said arm $q'$. So long as the fulcrum of the frame P and of the rod q remain in a line as shown at Fig. 4 the frame and the rod may be moved together without affecting the differential or relative movement which alone operates the valves through the arm $q'$ and shaft Q operating the valve gear. The coiled spring around the feeler rod $o'$ tends to keep the feeler in contact with the ground.

The cylinder N of the hydraulic motor secured by brackets to the side of the engine is provided with a valve box R containing valves illustrated in detail on Sheet V for admitting water under pressure to either side of the piston or allowing it to escape according to requirement.

It will be readily understood that the water under pressure necessary for working the hydraulic motor could be supplied by various means such for instance as a separate pump driven by the engine and charging a suitable accumulator or pumping against a loaded valve. Taking water direct from the boiler would be a very simple arrangement but it will be obvious that for economy of working it would be very objectionable and as it is desirable that no more additions should be made to the working parts of the engine than possible the following means have been devised for giving a constant supply of water under boiler pressure to the cylinder at the temperature of water in the supply tank by using the ordinary boiler feed pump only. In carrying out this arrangement I use a boiler feed pump S of ordinary construction (which in the drawings is a long stroke pump drawing its supply from the tank $S'$ beneath the boiler and driven from crosshead of engine). The pump which is fitted with the usual suction and delivery valves is made of rather larger capacity than necessary to supply the boiler only and it works in connection with a receiver T placed vertically in a suitable position at side of boiler. This vertical pipe T is of about double the capacity of hydraulic cylinder and at its top is connected to the check valve t on side of boiler and to pump delivery pipe the latter being carried down nearly to bottom and shown in Fig. 7. The bottom of reservoir is connected by pipe to the hydraulic cylinder valve box R. The check valve on side of boiler is made with screw beneath so that the valve can be raised off its seat when the receiver T is placed in communication with boiler and subject to same pressure. The action of this arrangement is that the valve box R of the hydraulic cylinder is supplied with water at boiler pressure but at same temperature as the feed water from the tank $S'$ because the connection for supply and delivery from pump S are at bottom of the receiver and as the pipe is vertical the hot water from boiler remains at the top. When the feed from the pump is more than the supply taken to the cylinder the hot water is forced back into boiler again. It is essential to satisfactory working that the valves for cylinder should be so arranged that a small movement should operate them to full capacity but that when closed the water should be locked in the cylinder so that the piston cannot move in either direction. This is accomplished by the arrangement of valves to be seen in the drawings (Sheet V). These valves are arranged diagonally so that when the lever is moved in one direction it lifts the pressure or admission valve for one end of the cylinder and the retaining and exhaust valve for the other end of cylinder and vice versa. The length of the lifting spindles is such that the exhaust and retaining valves are closed before the pressure or admission valves and thus the cylinder is always fully charged.

The valve box R (see Sheet V of the drawings) contains two pairs of valves—that is to say an admission valve and a retaining or exhaust valve for each end of the cylinder. In the drawings all the valves are shown closed. The water under pressure supply is at $r$. (See Figs. 8 and 10.) The valves $r'$ $r^2$ are the pressure valves which when opened admit pressure to the one or other end of the cylinder N. $r^{*\prime}$ $r^{*\prime}$ are the corresponding retaining or exhaust valves communicating with the eduction passage $r^*$ delivering over the tank S'.

The valve spindles are operated by means of a rocking plate U forked to embrace the spindles between collars fixed thereon. The rocking of this plate in its bearings by means of the arm $u$ attached thereto and the connecting rod $u'$ jointed to the arm $u$ and arm $q^2$ in connection with the feeler mechanism before explained gives the requisite movement to the valves in the required direction at the right instant and causes the hydraulic motor to lift or lower the diggers in the manner already described.

To operate the hydraulic mechanism by hand a lever arm $q^3$ keyed to the shaft Q is provided which can be depressed by means of a rod $q^4$.

In Sheet VI of the drawings I have shown an alternative device for the hydraulic motor by means of which the digger may be raised and lowered. The power in this case is derived from the fly wheel H which is channeled circumferentially (see Fig. 14) to receive a bowl $v$ on the summit of a short axle V which short axle has its bearing in the frame $x$ which is loosely mounted on the horizontal shaft X.

$v'$ is a bevel pinion on the same short axle V engaging with the bevel wheel $x'$ fast on the shaft X by means of which the latter is rotated.

$x^2$ is a worm on the end of the same shaft and $x^3$ is a segmental rack by means of which the digger shaft is raised or lowered when the shaft X is rotated.

The channel in the fly wheel H is somewhat wider than the diameter of bowl $v$ so that the latter may engage either with one side or with the other and receive rotation in either direction. The bowl $v$ is moved from side to side and held in contact with the fly wheel by means of the frame $x$ which rocks on the shaft X. To this frame $x$ is secured an arm $y$ jointed to the rod $y'$ which again is jointed to the arm $y^2$ fixed in the end of the jointed rod $y^3$. The rod $y^3$ is in connection with the feeler through which the inequalities of the ground are communicated to the digger raising and lowering mechanism. The rod $y^3$ which is jointed at $y^*$ and has a rocking movement in its bearings is supported by the lever P whereon is carried the threaded nut which receives the supporting adjusting screw O.

Parallel with the lever P and rod $y^3$ is the rod Z the fulcrums of the lever P rod Z and joint of the rod $y^3$ being all in line. (See Fig. 15.) The rod Z carries the feeler O which in this case is a small trailing wheel.

$z$ is a fork attached to the bearings of the wheel $o$ and jointed at its summit to the arm $z^2$ fixed on the rod $y^3$. The fork $z$ is also jointed to the lever P. It will thus be seen that there is a differential movement between the rod $y^3$ which works the driving pinion of the shaft $x$ and the lever P but the latter being under the control of the lifting mechanism of the digger gear through the screw O always overtakes the initial movement of the rod $y^3$ in either direction exactly in the manner explained with respect to the automatic lifting and lowering mechanism already described.

What I claim as my invention is—

1. In a digging apparatus for cultivating and tilling the soil, the combination of a locomotive engine with digging mechanism and means for raising and lowering the said mechanism, a ground feeler for automatically starting in either direction the said means for raising and lowering, and jointed levers connected with the feeler and with the said means of raising and lowering and with the diggers for the purpose of arresting the operation of the said means of raising and lowering as required to maintain the diggers at an even working depth during the travel of the engine over irregular or uneven surfaces; substantially as described.

2. In a locomotive agricultural digging apparatus provided with means consisting of a hydraulic motor substantially as described for raising and lowering the digging mechanism, the combination of jointed levers for arresting automatically the movements of the said motor, and a feeler pendent from the said levers and following the surface of the ground for the purpose of effecting the starting of said motor; substantially as herein set forth.

3. The combination with the digging mechanism of an agricultural engine of a hydraulic motor connected with the said digging mechanism a vertical receiver open to the engine boiler and connected to the engine feed pump and to the valve box of the hydraulic motor; substantially as herein described.

4. In agricultural locomotive engines the combination with the compensating driving gear of means for locking one or other of the disks comprised therein for the purpose of facilitating the turning of the engine short round upon one wheel substantially as described.

THOMAS COOPER.

Witnesses:
 HORACE SKIPPER,
  *Maltster, Gt. Ryburgh,*
 WILLIAM HY. ANDERSON,
  *Engineer's Clerk, Gt. Ryburgh.*